Figure 1:
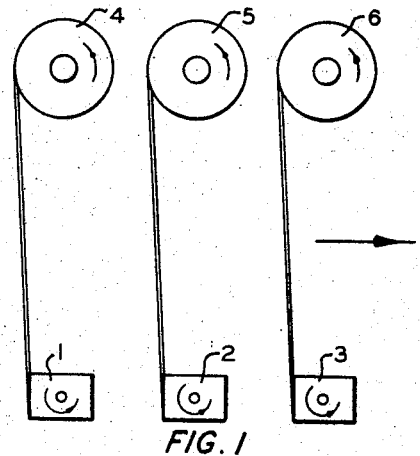

Nov. 9, 1965 F. J. ZAVASNIK 3,216,457
LAMINATED TUBULAR ARTICLE AND METHOD OF MAKING SAME
Filed April 18, 1962

INVENTOR.
F. J. ZAVASNIK
BY Young & Quigg
ATTORNEYS

United States Patent Office 3,216,457
Patented Nov. 9, 1965

3,216,457
LAMINATED TUBULAR ARTICLE AND
METHOD OF MAKING SAME
Fred J. Zavasnik, Bartlesville, Okla., assignor to Phillips Petroleum Company, a corporation of Delaware
Filed Apr. 18, 1962, Ser. No. 188,392
6 Claims. (Cl. 138—111)

This invention relates to a method of making laminated structures. More particularly, this invention relates to a method of making laminated structures of crystalline poly-1-olefins having a plurality of conduits within same. In one aspect this invention relates to a method of making a laminated structure of improved strength by forming the laminated structures of a biaxially oriented 1-olefin film. In another aspect this invention relates to a method of producing laminates having multiple passages through same and having increased rigidity and strength.

In the extrusion forming of thermoplastic materials, the design of the product is determined by the end use conditions encountered and the relatively low rigidity and tensile strengths obtained. Even when the shapes are strengthened by biaxial orientation at temperatures below the material crystallization temperature, the degree of strengthening and rigidity obtained is limited by the amount of radial expansion allowed by product dimensions and the relatively thick sections that are stretched.

I have now found that crystalline 1-olefin polymer laminates which have a tensile strength and rigidity many times greater than the same article if extrusion formed can be obtained by preparing the desired shape from laminates of film having imparted thereto biaxial orientation.

Thus, it is an object of the present invention to provide thermoplastic articles of 1-olefin polymers having increased rigidity and tensile strength. Another object of the present invention is to provide a novel method for preparing laminated thermoplastic shapes having increased rigidity and tensile strength.

Other objects, aspects and the several advantages of the present invention will be apparent from the disclosure, the drawings and the appended claims.

Fabrication of biaxially oriented film of crystalline poly-1-olefins by stretching an extruded tube at temperatures below the material crystallization temperature results in maximum strengthening of the film because of the radial and longitudinal directional stretch that can be performed and the relatively thin cross sections in the extruded tube and the final film. Such film can be prepared from any 1-olefin polymer having the requisite crystal content. Any other methods which will yield high molecular weight polymers of the required density, crystallinity, and melt index may also be employed such as those prepared in the presence of catalyst systems comprising organometallic compounds, i.e., triethylaluminum plus titanium tetrachloride, mixtures of ethylaluminum halides with titanium tetrachloride, and the like. The polymers which are applicable have a melt index not to exceed 50 and preferably the melt index does not exceed 5.

Highly crystalline polymers suitable for use in the present invention are preferably produced by the method described in U.S. Patent No. 2,825,721 of J. P. Hogan and R. L. Banks, issued on March 4, 1958. As described in detail in the Hogan and Banks patent, the polymers to be molded in accordance with the present invention can be produced by contacting an aliphatic 1-olefin with a catalyst comprising as its essential ingredient from 0.1 to 10 or more weight percent chromium in the form of chromium oxide, preferably including at least a portion of same as hexavalent chromium. The chromium oxide is ordinarily associated with at least one other oxide, particularly at least one oxide selected from the group consisting of silica, alumina, zirconia and thoria. It is preferred that the plastic materials which are to be molded in accordance with this invention be polymers of ethylene or propylene or mixtures of ethylene and other unsaturated hydrocarbons, e.g. mixtures of ethylene with minor amounts of monoolefins containing up to and including 6 carbon atoms per molecule, such as propylene, 1-butene and 1-pentene.

Methods of producing the desired orientation to obtain a film useful in the process of the present invention are disclosed by Diedrich et al. in U.S. Patent No. 2,961,711, by Haugh in U.S. Patent No. 2,904,841, and by Wiley et al. in U.S. Patent No. 2,412,187.

The crystalline 1-olefin polymers should have a crystal content of at least 60 percent and preferably above about 80 percent.

Figure 2:
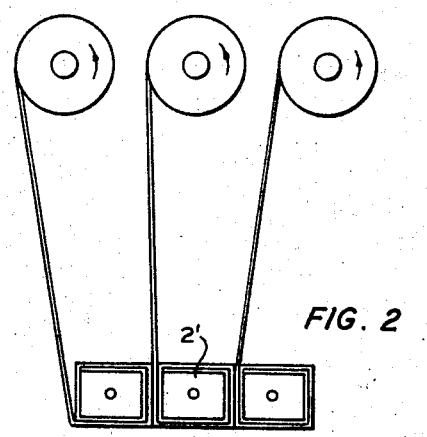
Figure 4:
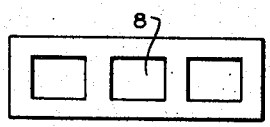
Figure 3:
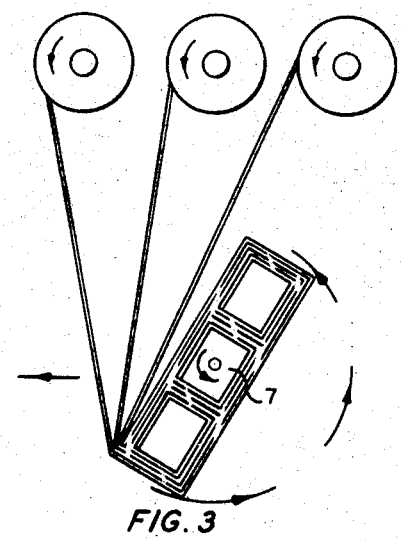

FIGURE 1 is a view of the starting position of the mandrels and film.
FIGURE 2 is a view of the repositioned mandrels.
FIGURE 3 is a view of the final wrapping stage with rotation about the central mandrel.
FIGURE 4 is a sectional view of the resulting tri-conduit tube.

As shown in FIGURE 1, mandrels 1, 2 and 3 having the shape of the ultimately desired laminate and structures are separated and receive biaxially oriented film from their individual film rolls 4, 5 and 6. The mandrels are then rotated until about one half of the final product wall thickness is placed thereon. The wrapping is then stopped and the mandrels are repositioned as shown in FIGURE 2, so as to be adjacent the central mandrel 2' and as close the central mandrel 2' as possible. The mandrels are then rotated about the center axis of the central mandrel as shown in FIGURE 3. The rotation of the unit around the central mandrel causes the film to be wrapped around the three wrapped mandrels, and each layer will be three film thicknesses thick. The winding is continued until the final desired thickness is achieved. The film ends are then cut and the outer surfaces restricted, and the resulting unit 8 is then heated in an oven or heated internally and externally with a hot fluid until the entire film lamination reaches temperature equilibrium. The unit 8 is then removed from the heating source and the finished object as shown in FIGURE 4 is cooled.

The following example is presented to further illustrate this invention.

*Example*

Quantity of biaxially oriented polyethylene film having a density of about 0.96, a crystallinity at 25° C. of above about 80 percent, a melt index of .2, 12 inches wide and having a thickness of 2 mils was rolled on three spools. The spools were placed on a tube rolling machine and the film withdrawn therefrom and wrapped under tension about three cylindrical mandrels rotating at a speed sufficient to permit convenient uniform application thereto. After about half of the desired thickness of the ultimate item was placed on the mandrels, the three mandrels were then repositioned so as to be adjacent each other, and wrapping was then continued by rotating the three mandrels about the axis of the center mandrel. In this manner after repositioning of the mandrels each resulting layer of film was 6 mils thick. When the desired thickness of ⅛ inch was reached, the mandrels were stopped and the film ends severed and secured. This was conveniently achieved by placing a cover layer of a plastic adhesive tape around the wound tube until the laminated structure could be placed within an aluminum clamping and holding member. The mandrels with the tube thereon were placed in an oven and cured. The curing was carried out by maintaining the temperature at about 270–280° F. for one hour during which time the layers of film tended to fuse and become indistinct. The heating is generally carried out at a temperature sufficient to achieve adhesion of the layers of film but below a temperature which would destroy the biaxial orientation. The mandrels and tube structure were then removed from the oven and externally cooled. This method of cooling causes shrinkage from the outside of the form inwardly to achieve additional compression of the laminations. The tape layer was removed and the tube removed from the mandrels. The finished tube was excellent in appearance, having a smooth inner and outer surface.

The resulting tube had the following properties.

| Tensile Strength, lb./in.² | Burst Strength, lb./in.² |
| --- | --- |
| 18,000 | 1,200 |

Generally three or more layers of polymer sheet are wound around the mandrels, and preferably ten or more layers are employed. As many layers as are necessary for the desired wall thickness are used.

While this invention has been illustrated by the formation of a tri-conduit tube, it is obvious that other tubular bodies having a plurality of conduits in same can be made merely by varying the number of mandrels employed.

Where a plurality of mandrels is employed, it may be more desirable to secure the film when relocating the mandrels from most of the spools rather than to attempt to wrap all of same, and thereby add the second half of the desired thickness of the final item from a single spool.

As will be evident to those skilled in the art, various modifications of this invention can be made, or followed, in the light of the foregoing disclosure and discussion without departing from the spirit or scope thereof.

I claim:

1. A process for preparing laminated articles of thermoplastic biaxially oriented film which comprises simultaneously separately wrapping on a plurality of mandrels a plurality of layers of said film until about one half of the desired laminate thickness is obtained, positioning said mandrels together so as to have same revolve around a common axis, continuing the wrapping of said film around said mandrels by rotating the repositioned mandrels around said common axis until the desired final laminate thickness is achieved, heat treating the resulting laminate for a time sufficient to bring the article to a uniform temperature and obtain an adhesion between the plurality of layers of said film, cooling the thus treated product and removing same from the mandrels.

2. The process of claim 1 wherein said thermoplastic biaxially oriented film is biaxially oriented 1-olefin film.

3. The process of claim 2 wherein said heating step is carried out at a temperature sufficient to achieve adhesion of said layers of film but below a temperature which would destroy the biaxial orientation.

4. The process of claim 3 wherein the laminated article is heated to a temperature of about 270° to 280° F.

5. A process for preparing a laminate structure of biaxially oriented thermoplastic material and having a plurality of conduits therein which comprises wrapping separately about a plurality of mandrels a plurality of layers of said biaxially oriented thermoplastic material so as to place thereon an amount of material sufficient to form about one-half the desired thickness of the desired laminated structure, moving said plurality of mandrels together adjacent each other along a common axis, continuing the wrapping of said film around said mandrels by rotating said adjacent mandrels about said common axis until the desired thickness is obtained, heating the resulting laminated structure for a time sufficient to achieve adhesion between the film layers, cooling the resulting laminated structure and thereafter removing same from the mandrels.

6. A tubular article of manufacture having a plurality of conduits therethrough, said tubular article being composed of a plurality of fused layers of biaxially oriented film so adapted as to provide a plurality of conduits therethrough.

References Cited by the Examiner

UNITED STATES PATENTS

| | | | |
| --- | --- | --- | --- |
| 2,445,290 | 7/48 | Gonda | 156—304 XR |
| 2,536,587 | 1/51 | Whalley | 156—304 XR |
| 2,929,744 | 3/60 | Mathes et al. | |
| 2,932,323 | 4/60 | Aries. | |
| 2,941,911 | 6/60 | Kumnick et al. | 156—86 |
| 3,037,529 | 6/62 | Hancik | 138—144 XR |

EARL M. BERGERT, *Primary Examiner.*